Patented Dec. 23, 1941

2,267,316

UNITED STATES PATENT OFFICE 2,267,316

PRESSED FIBROUS PRODUCT AND PROCESS

Wesley R. Thompson and William E. Flood, Metuchen, N. J., assignors to Catalin Corporation of America, a corporation of Delaware No Drawing. Application October 6, 1939, Serial No. 298,255

7 Claims. (Cl. 91—70)

Our invention relates to resin-treated, fibrous bodies and more particularly to a mass or sheet of matted vegetable fibers such as sisal strands surface coated or impregnated with a resin stable at atmospheric temperatures but adapted to be hardened quickly at elevated temperatures, and the resin treated mass being amenable to pressing or molding into substantially any desired form. This application contains subject matter derived from our copending applications Ser. No. 92,508, filed July 25, 1936 and Serial No. 188,066 filed February 1, 1938 and is a continuation in part of these applications.

The fibrous material such as a batting of loosely, matted fiber strands may be surface coated with the liquid resin resulting in only slight penetration or impregnation of the sheeted fibrous body and leaving a substantial thickness of the body in its natural porous, flexible and compressible state. Such surface coating may be applied by spraying or brushing the liquid resin onto the surface of the fibrous body.

The surface resin coating is hardened under heat and controlled relatively low pressure to provide a relatively smooth, finished resin surface on the material, the resin being applied on only one face of the material if desired. The finished material in this case is a mat-like sheeted body which is sufficiently flexible that it may be formed into practically any desired curvature; it is substantially compressible and is relatively porous or open textured. These characteristics render the finished material suitable for use in heat insulating, soundproofing, padding, upholstery, mattresses and other similar uses.

If a rigid molded type of article or body is desired the fibrous material in the form of a loose, compressible mass of fibers is thoroughly impregnated with the resin and the impregnated body then placed in a press or mold and subjected to heat and pressure sufficient to harden the resin and reduce the mass to the desired thickness and contour. In the usual case the thickness of the fibrous body will be reduced substantially by the pressing or molding treatment.

The molding pressure will depend upon the type of final product desired. If, for example, it is desired to produce an entirely hard body adapted to withstand substantial weight and stresses, the bulky, loosely matted, resin impregnated material will be compressed into a dense rigid form of substantially less thickness than the original material and sufficient resin will be used to provide the required hardness and strength.

In making any of the above described types of material we have discovered that by controlling the temperature and pressure used in compressing the resin-impregnated material we can produce the desired type of resin coating and in fact substantial hardness and rigidity of the material (which can be accomplished over a wide range of temperatures and pressures as pointed out in Patent No. 2,186,687) but still retain air pockets or cells between the strands or elements of the material so that the final body has a cellular structure. This may be used to advantage in insulating fields.

When using a relatively large amount of resin and pressing the impregnated fibrous material at high pressures and temperatures a hard, substantially non-flexible, board-like material is obtained. This material has a slick smooth finish and is especially suitable for panels, partition walls, tables and similar furnishings. The resin content provides a lustrous, lacquer-like surface which is in of itself resistant to water and dirt and does not require any printing or other surface treatment.

To obtain a clear, translucent lacquer type of coating or surface on the finished product, a resin capable of producing these characteristics should be used. A suitable resin for this purpose is a phenol formaldehyde resin prepared by condensing phenol and formaldehyde in the presence of an alkaline catalyst to form a colloidal solution or sol while in a hydrophilic state, the sol containing an appreciable amount of water in solution with the resin. The water content of the colloidal solution of resin or resin sol, prior to its application to the fibrous material should be reduced to the point where the resin will gel upon heating.

In carrying out this process for preparing the resin a relatively large molecular proportion of formaldehyde relative to the phenol is employed, i. e. a mol ratio of at least 1.5 mols of formaldehyde to each mol of phenol, and preferably in the ratio of 2 to 3 mols of formaldehyde to each mol of phenol; and the initial reaction, at least as to its final phases, is completed on the alkaline side. Subsequently, the mass is treated with acid to carry it over to the weakly acid condition, and the mass is dehydrated until it is sufficiently thick so that a gel will form on heating.

The above type of colloidal resin solution, or sol, when applied to the fibrous material and heated in accordance with this invention to remove a portion of the volatiles will be converted in situ to a true gel which is still hydrophilic and which still contains an appreciable amount of water colloidally dispersed throughout the mass of resin gel. Upon further application of heat and pressure to the fibrous material impregnated or coated with this resin gel, the gel will harden and have a cellular form and the water content in the form of minute droplets will be held in the pores or cells of this hardened gel structure. Upon hardening the gel changes from a hydrophilic to a hydrophobic form and is insoluble and infusible.

In view of the fact that the finished resin still contains an appreciable amount of water and has a cellular form, it will produce on the surface of the fibrous material and likewise in the interior, in the case of impregnation, a flexible, machinable form of coating or film. Accordingly, the resin treated fibrous material may be machined into various sizes and forms if not already molded into the desired form, without fracturing of the resin.

To facilitate applicaton of the resin to the fibrous material any suitable organic solvent may be added to the resin solution. This is preferably done prior to any gelation of the resin and prior to its application to the fibrous material. Examples of suitable organic volatile liquids which are compatible with the hydrophilic resin solution are as follows:

Esters:
  Diglycol diacetate
  Ethylene glycol diacetate
  Ethyl acetate
  Ethyl lactate Alcohols:
  Methyl alcohol
  Ethyl alcohol
  Propyl alcohol
  Isopropyl alcohol
  Butyl alcohol
  Diacetone alcohol
  Cyclohexanol alcohol Ketones:
  Dimethyl ketone
  Methyl ethyl ketone
  Mesityl oxide acetone
  Acetonylacetone Ether:
  Dioxane Ether Alcohols:
  Cellosolve
  Benzyl cellosolve
  Butyl cellosolve
  Butyl carbitol One of the commercial problems encountered in making the pressed products of this invention, such as for example a padding or support for the interior of automobile bodies, is shaping of these bodies and hardening of the resin in a very short time. For making automobile body furnishings on the usual high speed production lines, the processing of the material must be accomplished in short cycles such as 10 to 60 seconds. In other words, an arm rest or a padding for the car seat or top made of the above described resin impregnated or coated material must be capable of being molded or pressed into the desired permanent shape and ready for use by an operation requiring only a few seconds or sometimes a few minutes. Besides this requirement the resin coating or impregnation must be stable at atmospheric temperatures and pressures; that is, it must not set-up or harden under these conditions so that the resin treated body may be kept for a reasonable length of time before it is molded or pressed into the desired final object. Shut-downs of automobile factory operations over week-ends or for longer lengths of time impose these requirements.

To meet the above commercial requirements the resin employed must be substantially stable at room temperatures but nevertheless must be adapted to harden very quickly under conditions of elevated temperatures and pressures. We have found that a resin of the type described above and containing as a hardening accelerator a suitable amount of phosphoric acid will serve our purpose most effectively. The phosphoric acid has substantially no hardening effect on the resin at normal temperatures but causes very rapid hardening at temperatures above about 90° C. As explained more in detail in our said Patent No. 2,186,687, the speed of this cure will vary with the amount of phosphoric acid used which may, for example, range upwardly from as little as about 1% or 1.5%. Ordinarily it will not be advantageous to use more than 8% and a good working range is between about 2% to 4%. The amount required to produce a given setting time for the resin will depend somewhat upon the pH of the resin when the phosphoric acid is added.

The flexible and machinable properties of the resin component of our products are provided by the cellular structure and colloidally dispersed water content of the resin. This structure is a result of the processing of the resin, as described above, and is dependent upon, first the formation of a hydrophilic colloidal resin solution, the conversion by partial dehydration of this solution into a true gel containing a substantial amount of water, and the conversion of this gel by heat and pressure into a hardened cellular mass with the water dispersed in the form of minute droplets which are entrapped in the cells or pores of this cellular mass. Normally this processing of the resin to produce a cast resin body of cellular structure involves a slow progressive development which requires several days. To effect this same type of desirable hardened gel cellular structure in a matter of a few seconds, or even a few minutes time by high temperature-pressure treatment, is one of the marked characteristic novel features of this invention. The result is entirely unexpected since it would normally be thought that such strenuous treatment would destroy the gel and cellular structure.

In accordance with our invention, we have found that if a mass of the vegetable fibers or strands, as described above, is coated or impregnated with the hydrophilic phenol formaldehyde resin sol, and this treated material is heated, the resin will gel on the fibrous material and upon further heating and pressing of the material the resin will cure, that is, chemically harden into the rigid hardened cellular gel structure described above. The processing of the resin in situ on the fibrous material will cause the matted fibers of the material which are coated with the resin to bond together. Upon application of sufficient heat and pressure, the resin will form the clear, transparent lacquer type of surface film or coating, described above, on the surface of the fibrous material.

The following illustrative but non-limiting examples will further disclose the process and products characteristic of our invention. The resin composition for treating the fibrous material may be prepared as follows:

A colloidal solution of resin was prepared by reacting 200 parts of commercial formaldehyde (37%) with 100 parts of phenol using 3 parts of caustic soda as a condensing agent. The reaction was conducted in a jacketed kettle for about 2½ hours at a temperature of about 70° C. Vacuum was then applied which lowered the temperature and stopped the reaction. After about 10 hours dehydration with vacuum, 8.75 parts of lactic acid were added reducing the pH of the mass to about 4.3. The dehydration was continued using vacuum and a jacket temperature of about 90° C., until a sample of the clear sol showed a water content of about 8%.

To apply the above described type of resin composition to the fibrous material to make the products of our invention the hydrophilic resin sol is cut or thinned with an organic solvent in proportions of about 30% resin solution and 70% ethyl alcohol. To the resulting alcoholic resin solution is added about 4% of phosphoric acid as accelerator.

A mat of sisal fiber is now impregnated by dipping in the above resin composition, or if desired, the composition may be brushed or sprayed upon the sisal mat. The thus treated mat is now air dried for about one hour or if a shorter time is desired, the mat may be placed in an oven heated to about 100° C. and kept there for about 5 to 10 minutes. The purpose of this preliminary heating treatment is to remove a portion of the volatiles and convert the resin sol into hydrophilic gel form with the remaining water colloidally dispersed throughout the gel. The treated mat is now pressed at a relatively low pressure of about 300 pounds per square inch or less between platens of a press which are heated to about 275° F. to 300° F. and the pressing is continued for about 3 to 5 minutes, depending somewhat upon the thickness of the mat being used. During this pressing and heating treatment the phosphoric acid accelerator causes the phenol formaldehyde resin gel to harden gradually into the desired hard cellular gel form described above.

One of the features of the above described process is the pressing at low pressures to produce sufficient rigidity and compactness of the fibrous body, but still leave air pockets or cells in the material so that it has a cellular structure adapted for insulating purposes. This above described process is designed mainly for making pressed objects on a laboratory or semi-commercial plan.

For high speed quantity production of the impregnated fibrous bodies, the following example is illustrative:

This example illustrates the manufacture of arm rests for automobile bodies. For such purpose the sisal fibre mat, which is about ¾ inch thick and rolled up in about 100 yards length is impregnated with the resin by passing the fibre mat through a bath of the resin at room temperature. After saturation with the resin the mat is passed through squeeze rolls to remove excess resin and then passed through a suitable drier, such as a tunnel drier, heated to about 200° F. to 212° F. The mat is passed through the drier at such a speed that it will assume the above temperatures for several minutes sufficient to remove excess solvents and volatiles from the resin and form the hydrophilic gel.

The resin gel-impregnated mat is now blanked out into pieces that fit the mold which is in the shape of an arm rest, and one or more of these pieces is placed in the mold and pressed. The mold is heated to about 300° F. to 350° F. and the mat is pressed at a pressure of from about 300 to 1,000 pounds per square inch for about 5 to 20 seconds. The hot pressed mat now in the shape of an arm rest is removed from the mold and allowed to cool to room temperature. One of the above thicknesses of fibre mat will produce an arm rest article of about $\frac{1}{16}$ inch in thickness, which is rigid and dense in character. As many as desired of these may be combined.

For high speed production some or all of the above operations may be made continuous. The short pressing or molding time is made possible by the accelerator used in the resin. In this case the resin used may be of the same type described in the previous example, but the amount of phosphoric acid accelerator is increased to about 8%. This amount of accelerator in combination with the relatively high temperature and pressure effects the hardening of the resin in a matter of a few seconds time instead of a few minutes which is required under the conditions of the previous example.

Various modifications and changes may be made in the above described materials and procedures and products without departing from the scope of our invention, some of the novel features of which are defined in the appended claims.

We claim:

1. A process for producing a pressed, fibrous, resin impregnated body, comprising impregnating a fibrous body with a solution of a phosphoric acid accelerated, hardenable phenol formaldehyde resin sol produced by reacting 1 mol of phenol with about 1.5 to 3 mols of formaldehyde in the presence of an alkaline catalyst followed by neutralization of the excess alkali and dehydration of the reaction product to produce a hydrophilic sol containing a substantial amount of water, adding the phosphoric acid accelerator in an amount equal to between about 1% and 8%, heating the impregnated fibrous body to effect removal of a portion of the volatile content but leaving a substantial amount of water therein and heating sufficiently to convert in situ said hydrophilic sol into a gel on said sheet, said gel having the residual water colloidally dispersed throughout its cellular mass with the minute droplets of water entrapped in the cells, and subjecting said fibrous body impregnated with said hydrophilic cellular gel to further heat and pressure to harden said gel into a rigid infusible cellular form while retaining colloidally dispersed water in the cellular mass, the hardening of the resin gel being accelerated by said phosphoric acid.

2. A process as defined in claim 1 which includes the further steps of adding a volatile organic solvent to the hydrophilic resin sol before application of said sol to the fibrous body, impregnating the fibrous body with the organic solvent resin solution and substantially removing said volatile organic solvent during the initial heating of the impregnated fibrous body.

3. A pressed fibrous resin treated body comprising a body of fibrous material elements of which are coated with a phenol formaldehyde resin in the form of a hardened cellular gel with a substantial amount of water in colloidal sized droplets entrapped in the minute cells of said gel, said gel constituting the heat reaction product of a hydrophillic sol obtained by condensing 1 mol of phenol with about 1.5 mols to 3 mols of formaldehyde in an alkaline medium and subsequently neutralized and dehydrated and between about 1% and 8% of a phosphoric acid accelerator added, said gel being formed in situ on said fibrous body by heating said sol sufficient to form a gel and then to harden said gel with water colloidally dispersed therein.

4. A pressed fibrous resin treated body as defined in claim 3 in which the body is a mat of sisal fibers.

5. A pressed fibrous resin treated body as defined in claim 3 in which the resin is applied only to the surface of said body and the remainder of the body is in the form of compressible loosely arranged matted fibrous strands.

6. A pressed fibrous resin treated body as defined in claim 3 in which the fibrous body is thoroughly impregnated by the resin and is compressed to a hard rigid form.

7. A fibrous mass adapted to be shaped and hardened under heat and pressure comprising a fibrous body impregnated with a liquid resin composition which will not harden at room temperatures but will harden relatively rapidly at elevated temperatures, comprising the reaction products resulting from reacting at least 1.5 mols of formaldehyde and one mol of phenol in the presence of an alkaline catalyst and subsequently rendering the solution slightly acid and dehydrating, and about 1% to 8% of phosphoric acid.

WESLEY R. THOMPSON.
WILLIAM E. FLOOD.